US011050276B2

(12) United States Patent
Chen

(10) Patent No.: US 11,050,276 B2
(45) Date of Patent: Jun. 29, 2021

(54) WIRELESS CHARGING DEVICE

(71) Applicant: Primax Electronics Ltd., Taipei (TW)

(72) Inventor: Bo-An Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 157 days.

(21) Appl. No.: 16/579,535

(22) Filed: Sep. 23, 2019

(65) Prior Publication Data

US 2020/0412142 A1 Dec. 31, 2020

(30) Foreign Application Priority Data

Jun. 28, 2019 (TW) .................................. 108122936

(51) Int. Cl.
*H01M 10/46* (2006.01)
*H02J 7/00* (2006.01)
*H02J 7/02* (2016.01)

(52) U.S. Cl.
CPC ............ *H02J 7/0044* (2013.01); *H02J 7/025* (2013.01)

(58) Field of Classification Search
CPC ...... H02J 7/0044; H02J 7/0042; H02J 50/005; H02J 50/10; H02J 2310/22; F21V 21/14; G06F 1/181; G06F 1/1615; G06F 1/1622
USPC ............. 320/107, 108, 114, 115; 248/291.1, 248/274.1; 361/679.01, 679.02, 679.05, 361/679.06
See application file for complete search history.

(56) References Cited

U.S. PATENT DOCUMENTS

| 8,203,237 | B1 * | 6/2012 | Cowles | ................... | H02S 20/30 307/150 |
| 2007/0259554 | A1 * | 11/2007 | Lindblad | .............. | F16M 11/105 439/354 |
| 2014/0085814 | A1 * | 3/2014 | Kielland | ................ | F16M 11/10 361/679.55 |
| 2014/0340828 | A1 * | 11/2014 | Truong | .................... | H05K 7/16 248/122.1 |
| 2018/0358826 | A1 * | 12/2018 | Allen | ...................... | H02J 50/12 |
| 2019/0082824 | A1 * | 3/2019 | Matlin | .................. | F16M 11/24 |

* cited by examiner

Primary Examiner — Edward Tso
(74) Attorney, Agent, or Firm — Kirton McConkie; Evan R. Witt

(57) ABSTRACT

A wireless charging device includes a base, a charging board and an adjusting module. The charging board is movable relative to the base. The electronic device is supported by the charging board and the base collaboratively. The charging board transmits the electric power to the electronic device in a wireless transmission manner. The adjusting module is connected with the base and the charging board. The charging board is movable relative to the base through the adjusting module. The adjusting module includes a shape-changing mechanism and a sliding mechanism. The shape-changing mechanism is installed on the base and connected with the charging board. As the shape-changing mechanism is swung relative to the base, an installation status of the charging board is changed. The sliding mechanism is disposed on the shape-changing mechanism. The charging board is slidable relative to the base through the sliding mechanism.

9 Claims, 10 Drawing Sheets

WIRELESS CHARGING DEVICE

FIELD OF THE INVENTION

The present invention relates to a charging device, and more particularly to a wireless charging device using a wireless charging technology.

BACKGROUND OF THE INVENTION

Nowadays, a variety of commercially-available electronic devices are developed toward small size and light weightiness in order to possess the portability. In addition, the electronic devices have touch screens. By inputting commands through the touch screens, the electronic devices can be operated accordingly. For example, the electronic devices include smart phones, tablet computers, personal digital assistants (PDAs), handheld game consoles (e.g. PSP, NDSL and Gameboy series game consoles), or the like.

Due to the portability of the above electronic devices, these electronic devices cannot be connected with a power source at any time. For providing sufficient electric power to the electronic device, a built-in battery is usually installed in the electronic device. The battery is a chargeable battery. Consequently, the chargeable battery of the portable electronic device may be charged by the user in a place with the power socket.

In case that the residual battery capacity of the electronic device is insufficient, the chargeable battery of the portable electronic device may be charged through a connecting wire. A first end of the connecting wire is plugged into the electronic device, and a second end of the connecting wire is plugged into a power source or a mobile bank that is capable of storing electric power. Under this circumstance, the electric power provided by the power source or the mobile bank is transmitted to the electronic device through the connecting wire in order to charge the battery of the electronic device.

However, the applications of the charging process are usually restricted by the length of the connecting wire. For example, during the process of charging the electronic device, the connecting wire usually becomes hindrance from operating the device or arbitrarily moving the electronic device.

With development of a wireless charging technology, a wireless charging device for wirelessly charging the electronic device has been disclosed in order to solve the drawbacks of the wired charging technology of using the connecting wire. FIG. 1 schematically illustrates a conventional wireless charging device and an electronic device. In FIG. 1, the wireless charging device 11 and the electronic device 12 are shown. The wireless charging device 11 comprises a main body 110, a power cable 111, a driving module 112, a transmitter coil 113 and a first communication module 114. The electronic device 12 comprises a casing 120, a receiver coil 121, a receiving module 122, a battery (not shown) and a second communication module 123.

The power cable 11 of the conventional wireless charging device 11 is exposed outside the main body 10. Consequently, the power cable 11 can be connected with a power source (not shown). The driving module 112 and the transmitter coil 13 are both disposed within the main body 10. In addition, the driving module 112 is connected with the power cable 11 and the transmitter coil 13. When the driving module 112 is driven by the power source, the driving module 112 generates an electric current. When the electric current flows through the transmitter coil 13, magnetic induction or magnetic resonance occurs. In response to the magnetic flux generated through the magnetic induction or the magnetic resonance, the transmitter coil 13 outputs a corresponding electric power. The first communication module 114 of the wireless charging device 11 and the second communication module 123 of the electronic device 12 are in communication with each other in order to perform the subsequent wireless charging operation. On the other hand, the receiver coil 21 is disposed within the casing 120 of the conventional electronic device 12 for receiving the electric power from the transmitter coil 113 through the magnetic induction or the magnetic resonance. The battery is connected with the receiving module 122. After the electric power is received by the receiver coil 21, the electric power is stored in the battery so as to be utilized.

Generally, the main body 110 of the conventional wireless charging device 11 is designed to have a platform profile. In addition, the volume of the main body 110 of the conventional wireless charging device 11 is larger than the casing 120 of the conventional electronic device 12 in order to facilitate the user to place the conventional electronic device 12 thereon. During the process of transmitting the electric power from the conventional wireless charging device 11 to the conventional electronic device 12, the receiver coil 121 within the conventional electronic device 12 should be purposely placed at a position near the transmitter coil 113 of the conventional wireless charging device 11. That is, for allowing the receiver coil 121 to receive the electric power, the transmitter coil 113 should be aligned with the receiver coil 121 as precisely as possible.

Generally, during the charging process, the user still needs to use the electronic device. When the electronic device is placed on the platform-shaped main body of the wireless charging device, the line of the user's vision cannot be in parallel with the display screen of the electronic device. In other words, the conventional wireless charging device is not user-friendly. For overcoming this drawback, a wireless charging device is disclosed in Chinese Patent Publication No. CN108668522. The platform of the wireless charging device for placing the electronic device can be lifted. Since the line of the user's vision can be in parallel with the display screen of the electronic device, the wireless charging device is operated more conveniently during the wireless charging process. However, this wireless charging device still has some drawbacks. For example, the wireless charging device cannot be applied to the electronic device with various sizes. For example, a tablet computer is one kind of large-size electronic device. Generally, the receiver coil of the electronic device is located at a middle region within the electronic device. Since the size of the tablet computer or the similar electronic device is larger, the position of the receiver coil within this kind of electronic device is higher. When the larger-size electronic device is placed on the wireless charging device, the distance between the receiver coil of the electronic device and the transmitter coil of the wireless charging device is too large. Under this circumstance, it is difficult to perform the wireless charging process.

Therefore, there is a need of providing a wireless charging device for electronic devices with various sizes.

SUMMARY OF THE INVENTION

An object of the present invention provides a wireless charging device for electronic devices with various sizes.

In accordance with an aspect of the present invention, a wireless charging device is provided for supporting an electronic device and transmitting electric power to the electronic device in a wireless transmission manner. The wireless charging device includes a base, a charging board and an adjusting module. The charging board is movable relative to the base. The electronic device is supported by the charging board and the base collaboratively. The charging board transmits the electric power to the electronic device in the wireless transmission manner. The adjusting module is connected with the base and the charging board. When the charging board is moved relative to the base through the adjusting module, a position of the charging board is adjusted. The adjusting module includes a shape-changing mechanism and a sliding mechanism. The shape-changing mechanism is installed on the base and connected with the charging board. As the shape-changing mechanism is swung relative to the base, an installation status of the charging board is changed. The sliding mechanism is disposed on the shape-changing mechanism. The charging board is slidable relative to the base along a first direction through the sliding mechanism, so that the position of the charging board is adjusted.

In accordance with another aspect of the present invention, a wireless charging device is provided for supporting an electronic device and transmitting electric power to the electronic device in a wireless transmission manner. The wireless charging device includes a base, a charging board and an adjusting module. The charging board is movable and rotatable relative to the base. The electronic device is supported by the charging board and the base collaboratively. The charging board transmits the electric power to the electronic device in the wireless transmission manner. The adjusting module is connected with the base and the charging board. When the charging board is moved or rotated relative to the base through the adjusting module, a position of the charging board is adjusted. The adjusting module includes a shape-changing mechanism, a sliding mechanism and a rotating mechanism. The shape-changing mechanism is installed on the base and connected with the charging board. As the shape-changing mechanism is swung relative to the base, an installation status of the charging board is changed. The sliding mechanism is disposed on the shape-changing mechanism. The charging board is slidable relative to the base along a first direction through the sliding mechanism. The rotating mechanism is disposed on the sliding mechanism and connected with the charging board. The charging board is rotatable relative to the sliding mechanism through the rotating mechanism, so that an installation angle of the charging board is adjustable.

From the above descriptions, the present invention provides the wireless charging device. The charging board is movable relative to the base or even rotatable relative to the base through the adjusting module. Consequently, the position of the charging board is correspondingly adjusted. In such way, the wireless charging module within the charging board is very close to the receiver coil within the electronic device. Consequently, the wireless charging efficiency is enhanced. Since the structure of the adjusting module is simple, the adjusting module can be fixed within the charging board and the base. In other words, the wireless charging device of the present invention can be used to wireless charge the ordinary-size electronic device and the larger-size electronic device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
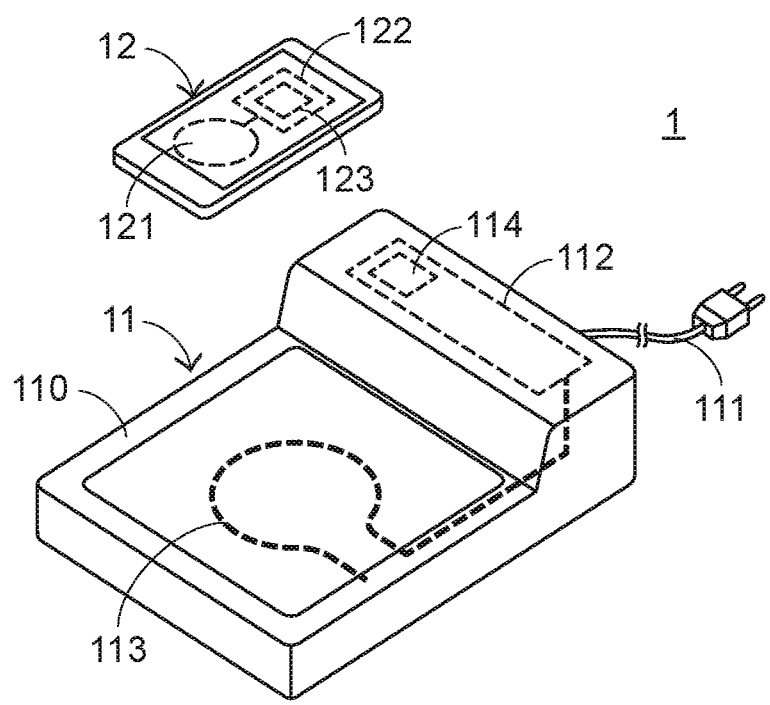
FIG. 1 schematically illustrates a conventional wireless charging device and an electronic device.

The present invention provides a wireless charging device in order to overcome the drawbacks of the conventional technologies. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
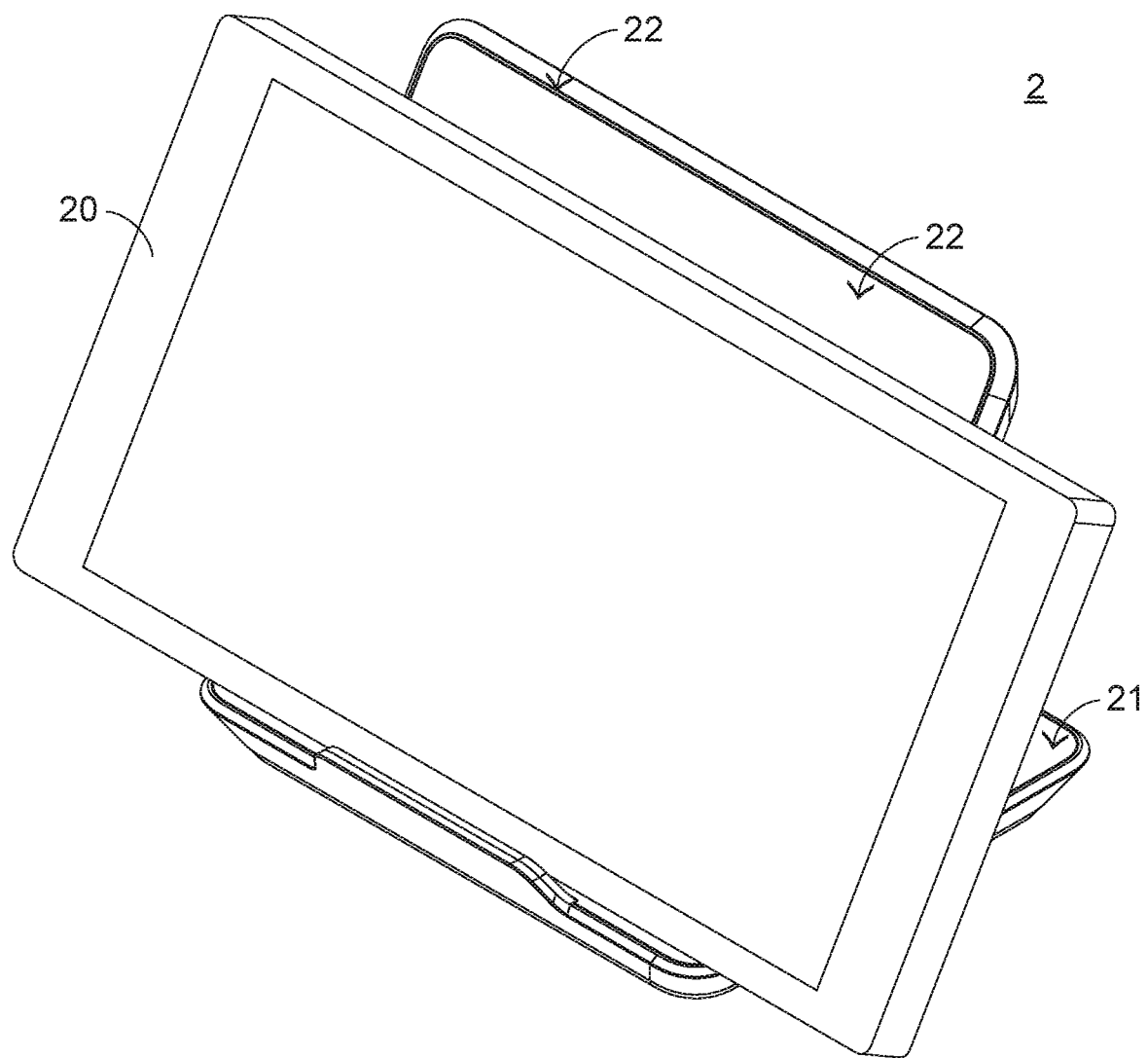
FIG. 2 is a schematic perspective view illustrating a wireless charging device and an electronic device according to a first embodiment of the present invention.
Figure 3:
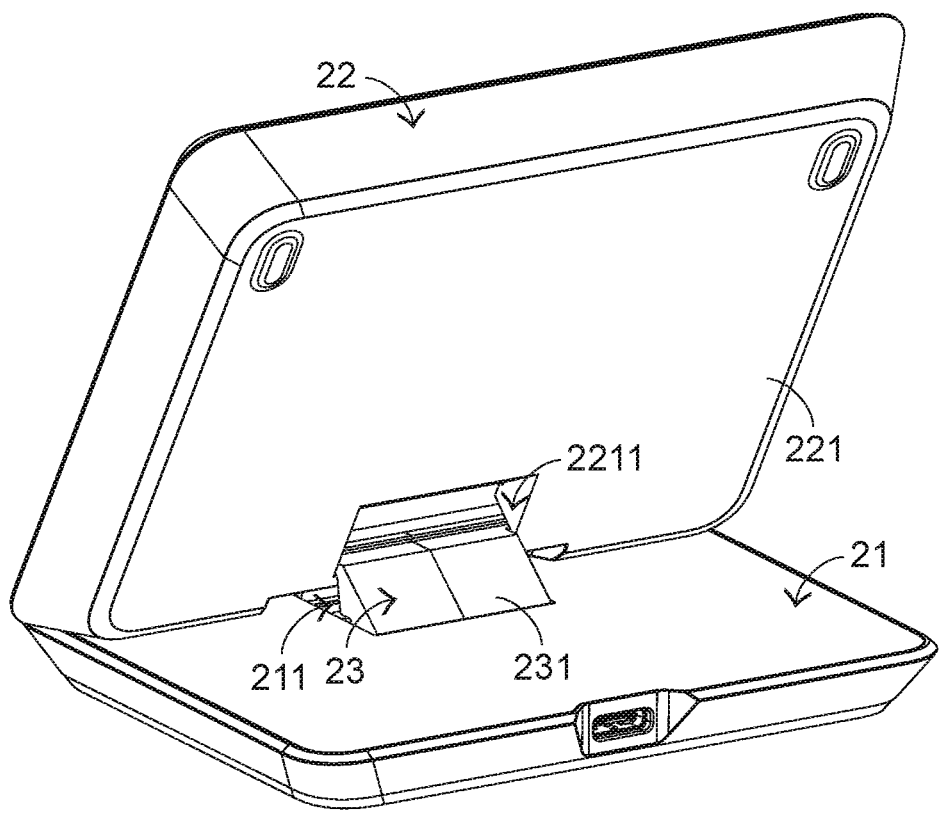
FIG. 3 is a schematic perspective view illustrating the wireless charging device according to the first embodiment of the present invention and taken along another viewpoint.
Figure 4:
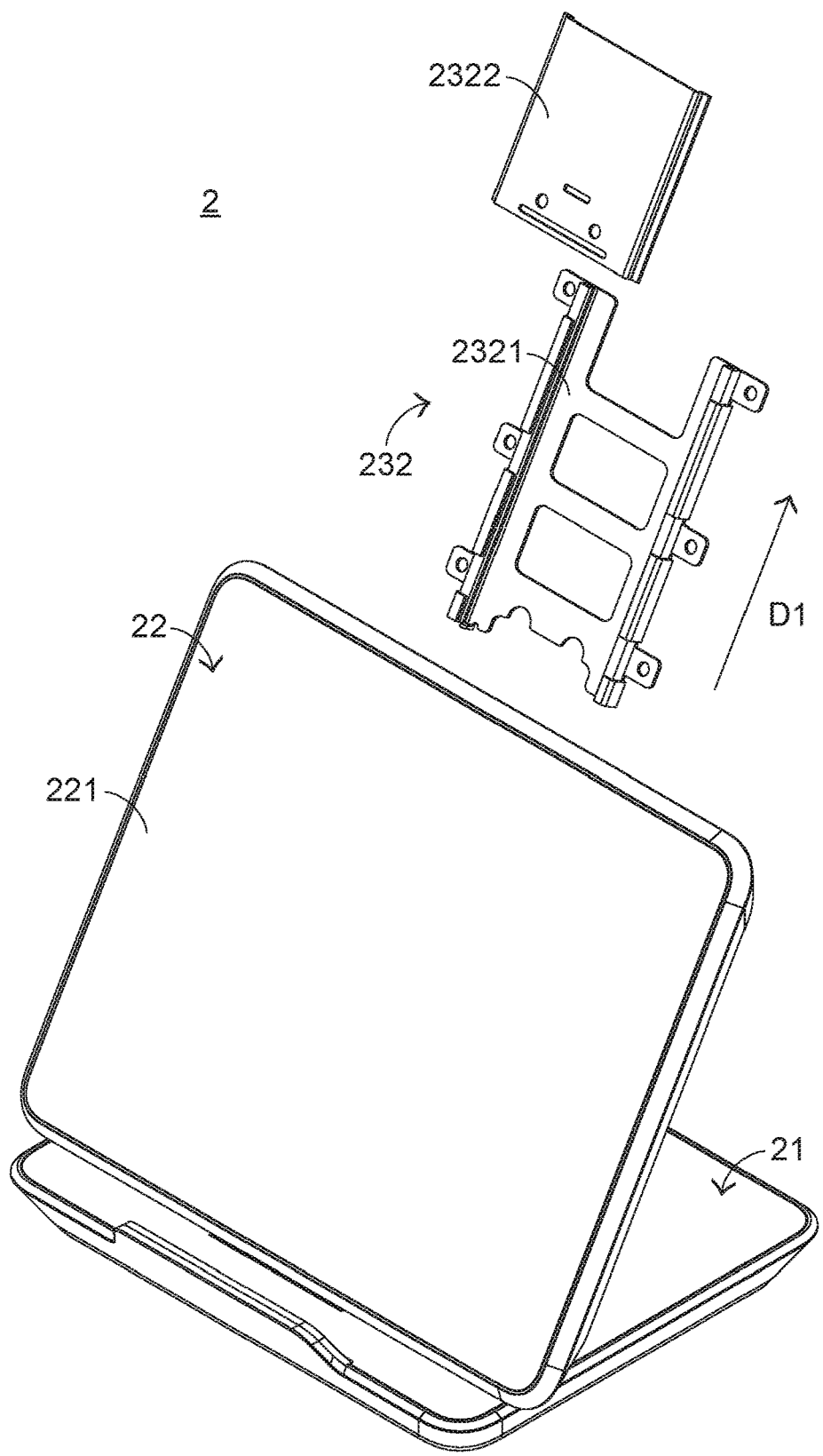
FIG. 4 is a schematic exploded view illustrating a portion of an adjusting module of the wireless charging device according to the first embodiment of the present invention.

Please refer to FIGS. 2, 3 and 4. FIG. 2 is a schematic perspective view illustrating a wireless charging device and an electronic device according to a first embodiment of the present invention. FIG. 3 is a schematic perspective view illustrating the wireless charging device according to the first embodiment of the present invention and taken along another viewpoint. FIG. 4 is a schematic exploded view illustrating a portion of an adjusting module of the wireless charging device according to the first embodiment of the present invention. The wireless charging device 2 is used for supporting the electronic device 20 and transmitting electric power to the electronic device 20 in a wireless transmission manner.

In this embodiment, the wireless charging device 2 comprises a base 21, a charging board 22 and an adjusting module 23. The charging board 22 is movable relative to the base 21. The charging board 22 has the following two functions. Firstly, the charging board 22 works with the base 21 to support the electronic device 20. Secondly, the charging board 22 is used for wirelessly transmitting the electric power to the electronic device 20 in order to perform the wireless charging process. The adjusting module 23 is connected with the base 21 and the charging board 22. When the charging board 22 is moved relative to the base 21 through the adjusting module 23, the position of the charging board 22 is adjusted. The adjusting module 23 comprises a shape-changing mechanism 231 and a sliding mechanism 232. The shape-changing mechanism 231 is installed on the base 21 and connected with the charging board 22. As the shape-changing mechanism 231 is swung relative to the base 21, the installation status of the charging board 22 is changed. The sliding mechanism 232 is disposed on the shape-changing mechanism 231. The charging board 22 can be slid relative to the base 21 along a first direction D1 through the sliding mechanism 232. Consequently, the position of the charging board 22 is adjustable.

Figure 5:
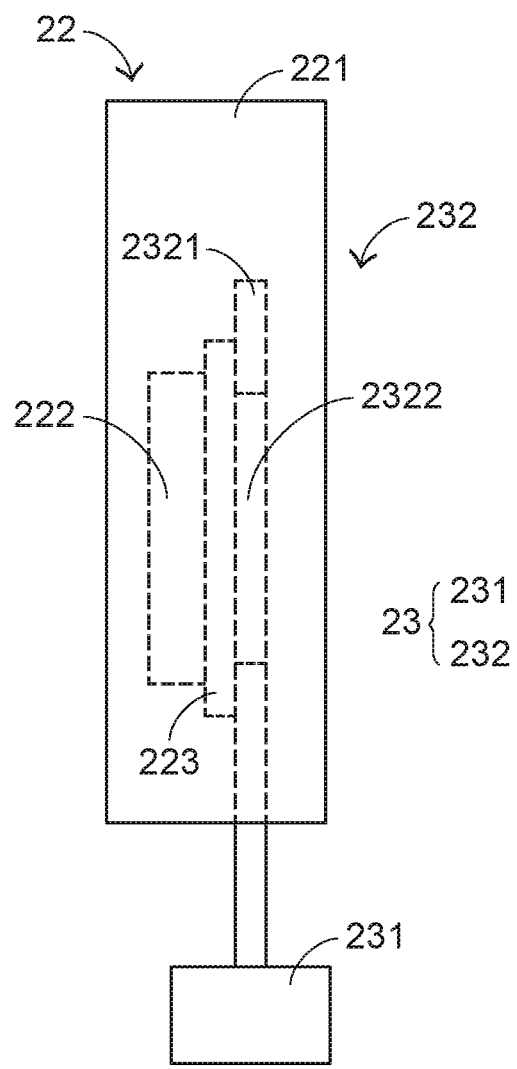
FIG. 5 schematically illustrates portions of the wireless charging module and the adjusting module of the wireless charging device according to the first embodiment of the present invention.

FIG. 5 schematically illustrates portions of the wireless charging module and the adjusting module of the wireless charging device according to the first embodiment of the present invention. Please refer to FIGS. 3, 4 and 5. The charging board 22 comprises a casing 221, a wireless charging module 222 and a fixing plate 223. The casing 221 is used for supporting the electronic device 20. The casing 221 comprises a connecting recess 2211. The connecting recess 2211 is formed in a backside surface of the casing 221. After the shape-changing mechanism 231 is inserted into the connecting recess 2211, the shape-changing mechanism 231 is connected with the casing 221. The wireless charging module 222 is disposed within the casing 221. The wireless charging module 222 is used for wirelessly transmitting the electric power to the electronic device 20. In an embodiment, the wireless charging module 222 comprises a transmitter coil and associated electronic components. The inner structure and operation of the wireless charging module 222 are well known to those skilled in the art, and are not redundantly described herein. The fixing plate 223 is disposed within the casing 221 and connected with the sliding mechanism 232 and the wireless charging module 222. When the sliding mechanism 232 is activated, the charging board 22 is slid relative to the base 21 along the first direction D1.

The sliding mechanism 232 is disposed on the shape-changing mechanism 231. When the sliding mechanism 232 is activated, the charging board 22 is slid relative to the base 21 along the first direction D1 and thus the position of the charging board 22 is adjusted. In this embodiment, the sliding mechanism 232 comprises a guiding track 2321 and a sliding plate 2322. The guiding track 2321 is fixed on the shape-changing mechanism 231. The sliding plate 2322 is combined with the guiding track 2321. In addition, the sliding plate 2322 can be slid relative to the guiding track 2321. The guiding track 2321 is arranged along the first direction D1. Consequently, the sliding plate 2322 can be slid relative to the guiding track 2321 along the first direction D1.

As shown in FIG. 3, the base 21 comprises an accommodation space 211. A smaller portion of the shape-changing mechanism 231 is accommodated within the accommodation space 211, or a greater portion of the shape-changing mechanism 231 is accommodated within the accommodation space 211. As the shape-changing mechanism 231 is swung and the greater portion of the shape-changing mechanism 231 is accommodated within the accommodation space 211, the charging board 22 is swung relative to the base 21 to be in a folded status (see FIG. 6). As the shape-changing mechanism 231 is swung and the smaller portion of the shape-changing mechanism 231 is accommodated within the accommodation space 211, the charging board 22 is swung relative to the base 21 to be in a support status (see FIG. 2).

In an embodiment, the shape-changing mechanism 231 is a swungable hinge structure. The inner structure and operation of the hinge structure are well known to those skilled in the art, and are not redundantly described herein. The guiding track 2321 may be fixed on any structure of the shape-changing mechanism 231 as long as the guiding track 2321 is in parallel with the casing 221 of the charging board 22. In this design, the sliding plate 2322 can be slid relative to the guiding track 2321 along the first direction D1. Moreover, since the sliding plate 2322 is connected with the fixing plate 223 of the charging board 22, the charging board 22 can be slid relative to the guiding track 2321 along the first direction D1.

Figure 6:
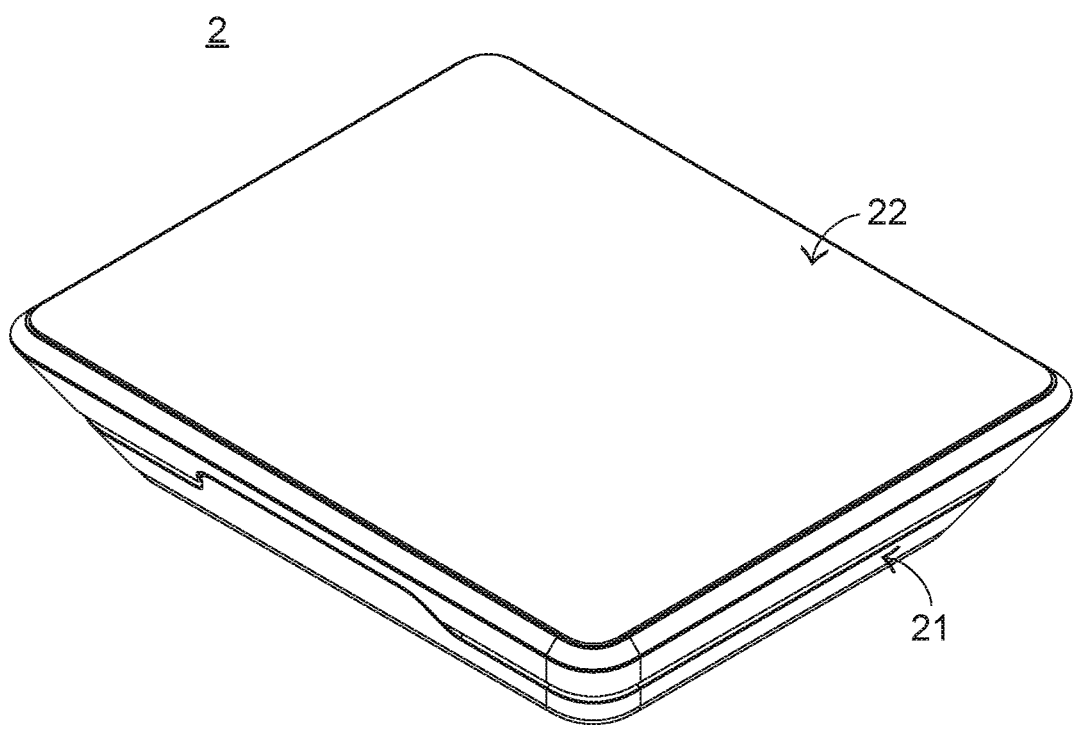
FIG. 6 schematically illustrates the wireless charging device in a folded status according to the first embodiment of the present invention.
Figure 7:
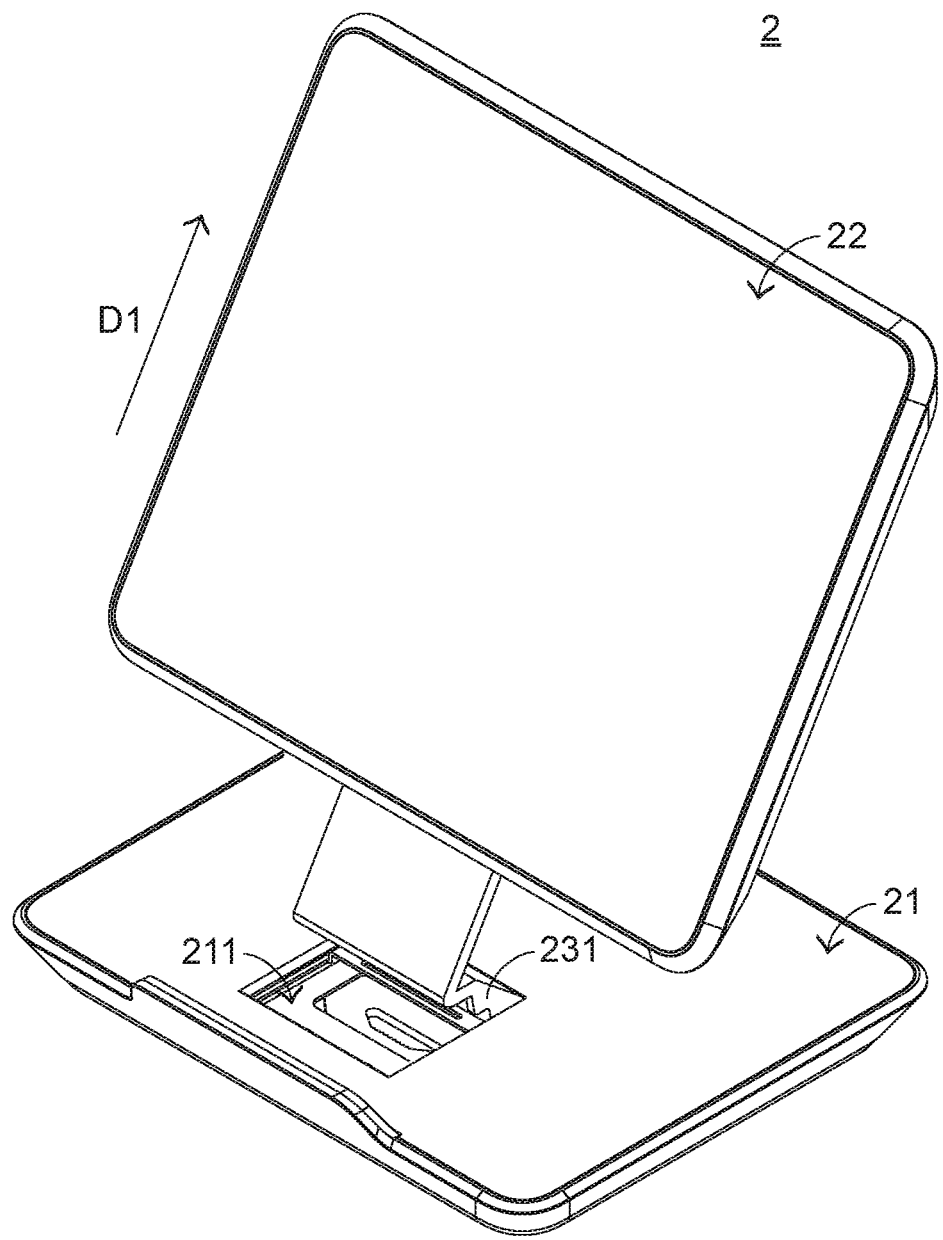
FIG. 7 schematically illustrates the wireless charging device according to the first embodiment of the present invention while the charging board is moved.

FIG. 7 schematically illustrates the wireless charging device according to the first embodiment of the present invention while the charging board is moved. Please refer to FIGS. 2, 6 and 7. According to the operation mode of the adjusting module 23, the wireless charging device 2 is selectively in one of three statuses. Firstly, the wireless charging device 2 is in the folded status (see FIG. 6). In the folded status, the electronic device 20 does not need to be wirelessly charged. Under this circumstance, the wireless charging device 2 has a platform-shape profile, and the electronic device 20 can be placed on the wireless charging device 2. Secondly, the wireless charging device 2 is in a first support status (see FIG. 2). In the first support status, the electronic device 20 can be wirelessly charged by the wireless charging device 2. Under this circumstance, the display screen of the electronic device 20 on the wireless charging device 2 can be in parallel with the line of the user's vision. Consequently, the electronic device 20 can be operated in a user-friendly manner. Thirdly, the wireless charging device 2 is in a second support status. When the wireless charging device 2 is in the first support status, the wireless charging device 2 can be switched to the second support status. As the charging board 22 is pulled along the first direction D1, the charging board 22 is slid relative to the base 21 along the first direction D1 and moved away from the base 21. Consequently, the wireless charging device 2 is in the second support status (see FIG. 7). In the second support status, the wireless charging device 2 is suitable for wirelessly charging a larger-size electronic device such as a tablet computer. Since the charging board 22 is moved to a higher position, the wireless charging module 222 of the wireless charging device 2 is close to the receiver coil (not shown) within the larger-size electronic device.

Figure 8:
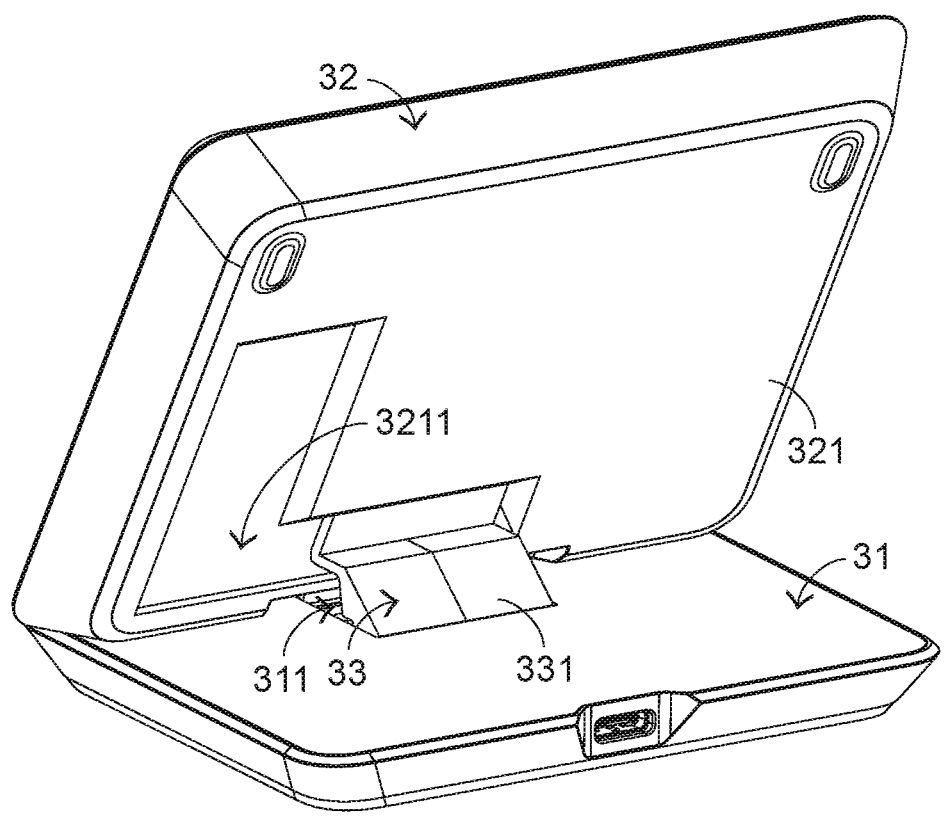
FIG. 8 is a schematic perspective view illustrating a wireless charging device according to a second embodiment of the present invention and taken along the backside viewpoint.
Figure 9:
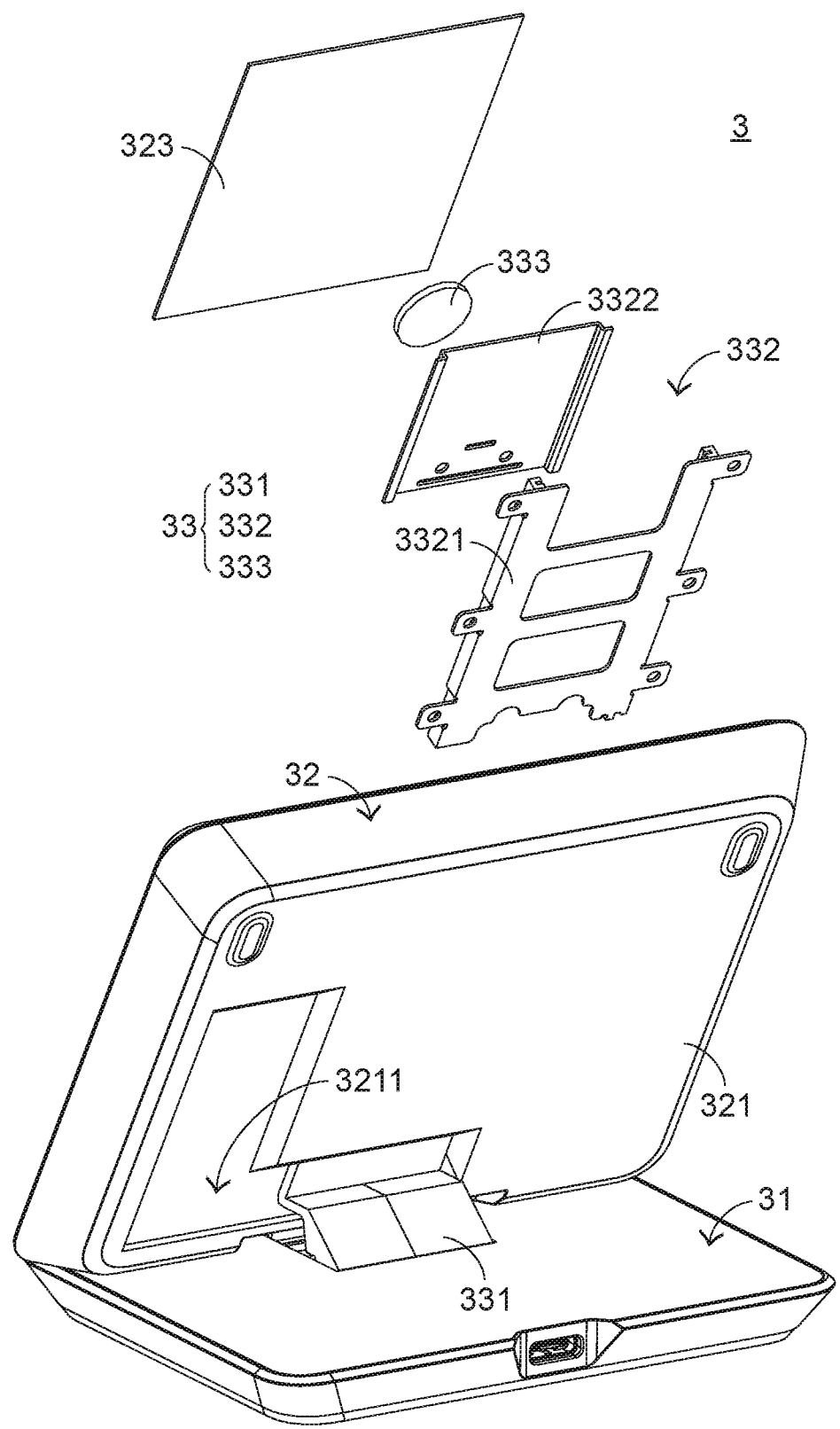
FIG. 9 is a schematic exploded view illustrating a portion of the wireless charging device according to the second embodiment of the present invention and taken along the backside viewpoint.

Hereinafter, a wireless charging device of a second embodiment of the present invention will be described with reference to FIGS. 8 and 9. FIG. 8 is a schematic perspective view illustrating a wireless charging device according to a second embodiment of the present invention and taken along the backside viewpoint. FIG. 9 is a schematic exploded view illustrating a portion of the wireless charging device according to the second embodiment of the present invention and taken along the backside viewpoint. The wireless charging device 3 is used for supporting the electronic device (not shown) and transmitting electric power to the electronic device in a wireless transmission manner.

In this embodiment, the wireless charging device 3 comprises a base 31, a charging board 32 and an adjusting module 33. The base 31 comprises an accommodation space 311. The charging board 32 comprises a casing 321, a wireless charging module (not shown) and a fixing plate 323. The casing 321 comprises a connecting recess 3211. The structures and functions of the components of the wireless charging device 3 which are identical to those of the first embodiment are not redundantly described herein. In comparison with the first embodiment, the structure and operation of the adjusting module 33 are distinguished.

The adjusting module 33 comprises a shape-changing mechanism 331, a sliding mechanism 332 and a rotating mechanism 333. The shape-changing mechanism 331 is installed on the base 31 and connected with the charging board 32. As the shape-changing mechanism 331 is swung relative to the base 31, the installation status of the charging board 32 is changed. The sliding mechanism 332 is disposed on the shape-changing mechanism 331. The charging board 32 is movable relative to the base 31 along a first direction D1 through the sliding mechanism 332. In this embodiment, the sliding mechanism 332 comprises a guiding track 3321 and a sliding plate 3322. The structure of the sliding mechanism 332 is similar to that of the first embodiment, and is not redundantly described herein. The rotating mechanism 333 is disposed on the sliding plate 3322 of the sliding mechanism 332 and connected with the fixing plate 323 of the charging board 32. The charging board 32 is rotatable relative to the sliding mechanism 332 through the rotating mechanism 333. Consequently, the installation angle of the charging board 32 is adjustable.

As shown in FIG. 9, the fixing plate 323 is connected with the rotating mechanism 333, and the rotating mechanism 333 is installed on the sliding plate 3322. Consequently, the charging board 32 is rotatable relative to the sliding mechanism 332. Moreover, when the sliding mechanism 332 is activated, the charging board 32 is slid relative to the base 31 along a first direction D1. In other words, when the adjusting module 33 is activated, the charging board 32 is movable and rotatable relative to the base 31. As shown in FIG. 8, the shape of the connecting recess 3211 of the casing 321 is distinguished from the connecting recess 2211 of the first embodiment. In this embodiment, a portion of the shape-changing mechanism 331 is accommodated within the connecting recess 3211. As the charging board 32 is rotated, the space of the connecting recess 3211 needs to be large enough to accommodate the shape-changing mechanism 331. If the space of the connecting recess 3211 is insufficient, the charging board 32 is hindered from being rotated smoothly. In this embodiment, the connecting recess 3211 is L-shaped. It is noted that the shape of the connecting recess 3211 is not restricted. For example, in another embodiment, the connecting recess has a rectangular shape. However, for providing a space for rotating the charging board, the connecting recess of this embodiment needs to be larger than the connecting recess 2211 of the first embodiment.

Figure 10:
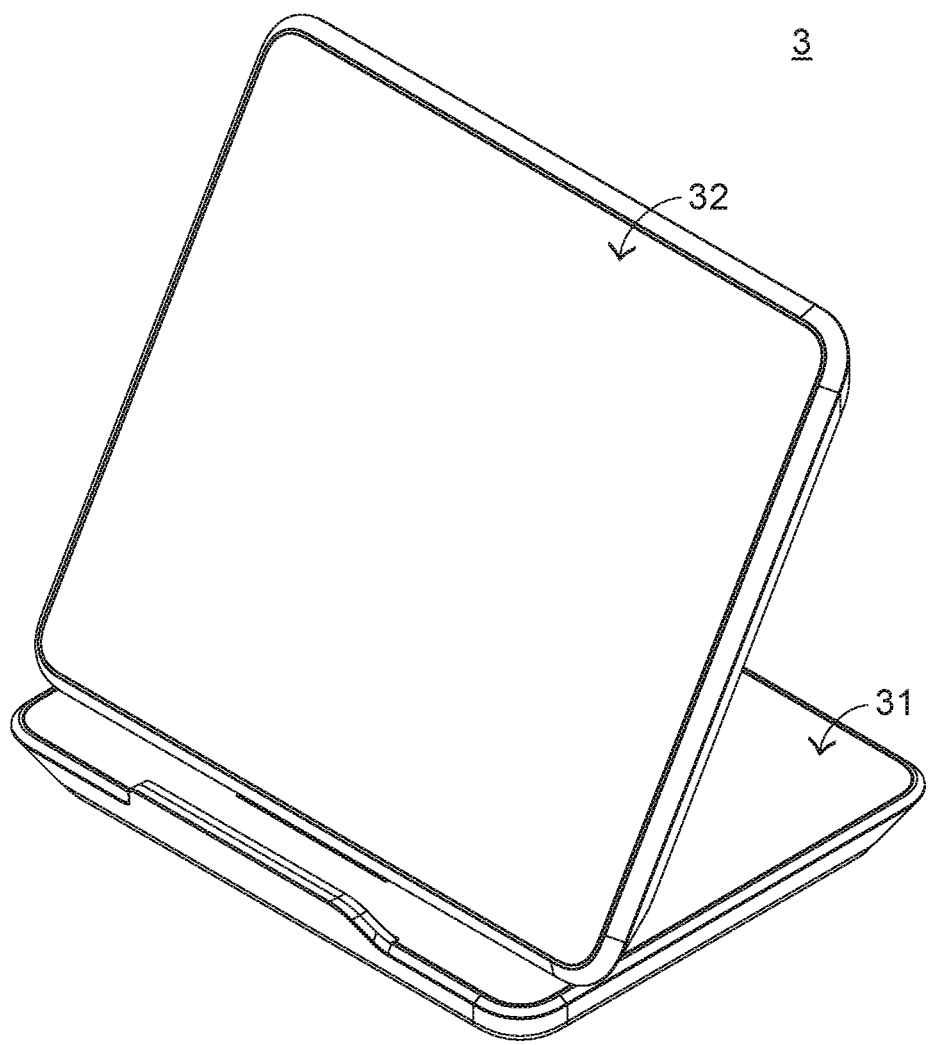
FIG. 10 schematically illustrates the wireless charging device in a straight support status according to the second embodiment of the present invention.

Similarly, the wireless charging device 3 can be operated in the three statuses as shown in FIGS. 2, 6 and 7. Moreover, when the wireless charging device 3 is in the second support status as shown in FIG. 7, the charging board 32 may be further rotated relative to the base 31. Consequently, the charging board 32 is switched to a straight support status (see FIG. 10). In the straight support status, the electronic device is supported on the wireless charging device 3 in a straight manner. Consequently, the user can use the electronic device during the wireless charging process.

From the above descriptions, the present invention provides the wireless charging device. The charging board is movable relative to the base or even rotatable relative to the base through the adjusting module. Consequently, the position of the charging board is correspondingly adjusted. In such way, the wireless charging module within the charging board is very close to the receiver coil within the electronic device. Consequently, the wireless charging efficiency is enhanced. Since the structure of the adjusting module is simple, the adjusting module can be fixed within the charging board and the base. In other words, the wireless charging device of the present invention can be used to wireless charge the ordinary-size electronic device and the larger-size electronic device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging device for supporting an electronic device and transmitting electric power to the electronic device in a wireless transmission manner, the wireless charging device comprising:
    a base;
    a charging board movable relative to the base, wherein the electronic device is supported by the charging board and the base collaboratively, and the charging board transmits the electric power to the electronic device in the wireless transmission manner; and
    an adjusting module connected with the base and the charging board, wherein when the charging board is moved relative to the base through the adjusting module, a position of the charging board is adjusted, wherein the adjusting module comprises:
        a shape-changing mechanism installed on the base and connected with the charging board, wherein as the shape-changing mechanism is swung relative to the base, an installation status of the charging board is changed; and
        a sliding mechanism disposed on the shape-changing mechanism, wherein the charging board is slidable relative to the base along a first direction through the sliding mechanism, so that the position of the charging board is adjusted.

2. The wireless charging device according to claim 1, wherein the sliding mechanism comprises:
    a guiding track fixed on the shape-changing mechanism; and
    a sliding plate combined with the guiding track, wherein the sliding plate is slidable relative to the guiding track.

3. The wireless charging device according to claim 2, wherein the charging board comprises:
    a casing for supporting the electronic device, wherein the casing has a connecting recess, and the connecting recess is formed in a backside surface of the casing, wherein the shape-changing mechanism is inserted into the connecting recess and connected with the casing;

a wireless charging module disposed within the casing, wherein the wireless charging module transmits the electric power to the electronic device in the wireless transmission manner; and a fixing plate disposed within the casing and connected with the sliding plate, wherein the charging board is slidable relative to the base along the first direction through the sliding plate.

4. The wireless charging device according to claim 2, wherein the wireless charging device further comprises a rotating mechanism, and the rotating mechanism is disposed on the sliding mechanism and connected with the charging board, wherein the charging board is rotatable relative to the sliding mechanism through the rotating mechanism, so that an installation angle of the charging board is adjustable.

5. The wireless charging device according to claim 1, wherein the base comprises an accommodation space, and a first portion of the shape-changing mechanism or a second portion of the shape-changing mechanism greater than the first portion is selectively accommodated within the accommodation space, wherein as the shape-changing mechanism is swung and the second portion of the shape-changing mechanism is accommodated within the accommodation space, the charging board is swung relative to the base to be in a folded status, wherein as the shape-changing mechanism is swung and the first portion of the shape-changing mechanism is accommodated within the accommodation space, the charging board is swung relative to the base to be in a support status.

6. A wireless charging device for supporting an electronic device and transmitting electric power to the electronic device in a wireless transmission manner, the wireless charging device comprising:

a base;

a charging board movable and rotatable relative to the base, wherein the electronic device is supported by the charging board and the base collaboratively, and the charging board transmits the electric power to the electronic device in the wireless transmission manner; and an adjusting module connected with the base and the charging board, wherein when the charging board is moved or rotated relative to the base through the adjusting module, a position of the charging board is adjusted, wherein the adjusting module comprises:

a shape-changing mechanism installed on the base and connected with the charging board, wherein as the shape-changing mechanism is swung relative to the base, an installation status of the charging board is changed;

a sliding mechanism disposed on the shape-changing mechanism, wherein the charging board is slidable relative to the base along a first direction through the sliding mechanism; and a rotating mechanism disposed on the sliding mechanism and connected with the charging board, wherein the charging board is rotatable relative to the sliding mechanism through the rotating mechanism, so that an installation angle of the charging board is adjustable.

7. The wireless charging device according to claim 6, wherein the sliding mechanism comprises:

a guiding track fixed on the shape-changing mechanism; and a sliding plate combined with the guiding track, wherein the sliding plate is slidable relative to the guiding track, and the rotating mechanism is disposed on the sliding plate.

8. The wireless charging device according to claim 6, wherein the charging board comprises:

a casing for supporting the electronic device, wherein the casing has a connecting recess, and the connecting recess is formed in a backside surface of the casing, wherein the shape-changing mechanism is inserted into the connecting recess and connected with the casing;

a wireless charging module disposed within the casing, wherein the wireless charging module transmits the electric power to the electronic device in the wireless transmission manner; and a fixing plate disposed within the casing and connected with the rotating mechanism, wherein the fixing plate is rotatable relative to the sliding mechanism through the rotating mechanism.

9. The wireless charging device according to claim 6, wherein the base comprises an accommodation space, and a first portion of the shape-changing mechanism or a second portion of the shape-changing mechanism greater than the first portion is selectively accommodated within the accommodation space, wherein as the shape-changing mechanism is swung and the second portion of the shape-changing mechanism is accommodated within the accommodation space, the charging board is swung relative to the base to be in a folded status, wherein as the shape-changing mechanism is swung and the first portion of the shape-changing mechanism is accommodated within the accommodation space, the charging board is swung relative to the base to be in a support status.

* * * * *